US006827001B2

(12) United States Patent
Engle et al.

(10) Patent No.: US 6,827,001 B2
(45) Date of Patent: Dec. 7, 2004

(54) PRESSURE ACTUATOR DIAPHRAGM CASING WITH AIR PASSAGES

(75) Inventors: Chad M. Engle, Marshalltown, IA (US); Lynn D. Mahncke, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 10/359,798

(22) Filed: Feb. 6, 2003

(65) Prior Publication Data

US 2004/0154467 A1 Aug. 12, 2004

(51) Int. Cl.[7] .............................. F01B 19/00; F16J 3/00
(52) U.S. Cl. ................................................ 92/93; 92/99
(58) Field of Search ............................ 92/98 R, 93, 99, 92/104, 105

(56) References Cited

U.S. PATENT DOCUMENTS 2,574,574 A 11/1951 Ives
2,608,211 A 8/1952 Thorburn et al.
3,241,805 A 3/1966 Schumann
4,741,252 A * 5/1988 Harter et al. .................. 92/99
5,249,508 A * 10/1993 Hasegawa et al. ............. 92/99
6,164,187 A * 12/2000 Stojic ............................ 92/99
6,349,629 B1 * 2/2002 Plantan et al. ................. 92/99

FOREIGN PATENT DOCUMENTS

DE 1 259 162 1/1968
GB 2 003 987 3/1979
GB 2 106 184 4/1983

OTHER PUBLICATIONS

Samson, Pneumatic Actuator, Type 3271, Data Sheet, Jul. 2001.
International Search Report and Written Opinion of the International Searching Authority, in PCT/US04/01486.

* cited by examiner

*Primary Examiner*—Thomas E. Lazo
(74) *Attorney, Agent, or Firm*—Marshall, Gerstein & Borun LLP

(57) ABSTRACT

A control valve pressure actuator of the pressure-to-close type is provided with a housing in which an upper diaphragm casing thereof includes one or more air passage channels. Each of the air passage channels facilitates circulation of air above a diaphragm within the pressure actuator at all times, including when the diaphragm is in a fully open position. By permitting the circulation of air above the diaphragm even when in a fully open position, adjacent an inside surface of the top of the upper diaphragm casing, there is not a tendency for the diaphragm, biased toward the open position by springs, to stick to the inside surface of the top of the upper diaphragm casing.

12 Claims, 3 Drawing Sheets

PRESSURE ACTUATOR DIAPHRAGM CASING WITH AIR PASSAGES

BACKGROUND

1. Field of the Disclosure

This disclosure relates generally to control valves and, more particularly, to pressure actuators of the pressure-to-close type and to the use of air passages in the upper diaphragm casing.

2. Description of the Prior Art

Control valve pressure actuators of the pressure-to-close type are designed to fail such that the diaphragm of the control valve remains in an open position, at the top of the inside surface of the upper diaphragm casing, in the event of a loss of air pressure. The diaphragm is biased toward the open position by a plurality of springs and air is introduced through a vent, or air port, provided in the top of the upper diaphragm casing at a high pressure to urge the diaphragm to the closed position, away from the upper diaphragm casing.

Due to the high spring force exerted on the diaphragm in the direction toward the upper diaphragm casing, there can be a problem of the diaphragm becoming sealed against the upper casing. As a result, the diaphragm can stick in the upper, i.e. failed-open position. While some have attempted to overcome this problem through the use of additional materials mounted above the diaphragm and/or below the inside surface of the upper diaphragm casing, it would be desirable if this and other problems in pressure-to-close type control valve pressure actuators could be diminished or altogether eliminated without resorting to additional materials, which detrimentally add cost and manufacturing time, and which nevertheless may not completely prevent the diaphragm from sticking in the open position, particularly after long term use, as over time, such materials may tend to degrade.

SUMMARY

A pressure-to-close type control valve pressure actuator is provided with a housing including an upper diaphragm casing and a lower diaphragm casing. Within the housing, a diaphragm made of a cloth-reinforced rubber, such as Nitrile, is mounted on a diaphragm plate, which in turn is mounted on one or more springs. The spring or springs serve to bias the diaphragm toward an open position, i.e. toward the top of the inner surface of the upper diaphragm casing, such that the control valve pressure actuator fails with the diaphragm in the open position in the event of a loss of air pressure.

In order to prevent the diaphragm from sealing against the inner surface of the upper diaphragm casing, it is desirable to allow air to circulate in a region between the diaphragm and the inner surface of the upper diaphragm casing at all times, even when the diaphragm is in its highest, i.e. failed, position. In order to allow such air circulation, we have found that channels defining air passages may be imparted to the upper diaphragm casing.

Such air passages not only increase the effective area available for pressurization on the diaphragm, and thereby overcome the problem of the diaphragm sealing against the inner surface of the upper diaphragm casing, but also advantageously provide additional stiffening of the upper diaphragm casing. This additional stiffening enables the control valve pressure actuator to operate at even higher pressures than conventional diaphragm casings before reaching an overpressure situation.

The air passages are preferably imparted to the upper diaphragm casing at the time of stamping of the upper diaphragm casing, but alternatively could be cast into an upper diaphragm casing. It has been found that various quantities and configurations of the air passages are possible and may be selected by the diaphragm casing manufacturer as desired for a particular sized diaphragm casing. For example, while relatively small upper diaphragm casings may lack sufficient surface area to provide many such air passages while still affording sufficient flat surfaces upon which to provide any necessary and/or desired markings, such as model number, control valve specifications, ratings, manufacturing date, and the like, relatively larger diaphragm casings may have sufficient surface area for comparatively more air passages.

The air passages are able to prevent sealing of the diaphragm to the upper diaphragm casing, at least in part, due to the fact that they increase the effective area available for pressurizing the diaphragm. These and other advantages of the air passages for the upper diaphragm casing will become clear from the following Detailed Description of the Preferred Embodiments and the several views of the drawing, in which:

DETAILED DESCRIPTION OF THE PREFERRED EMBODIMENTS

Figure 1:
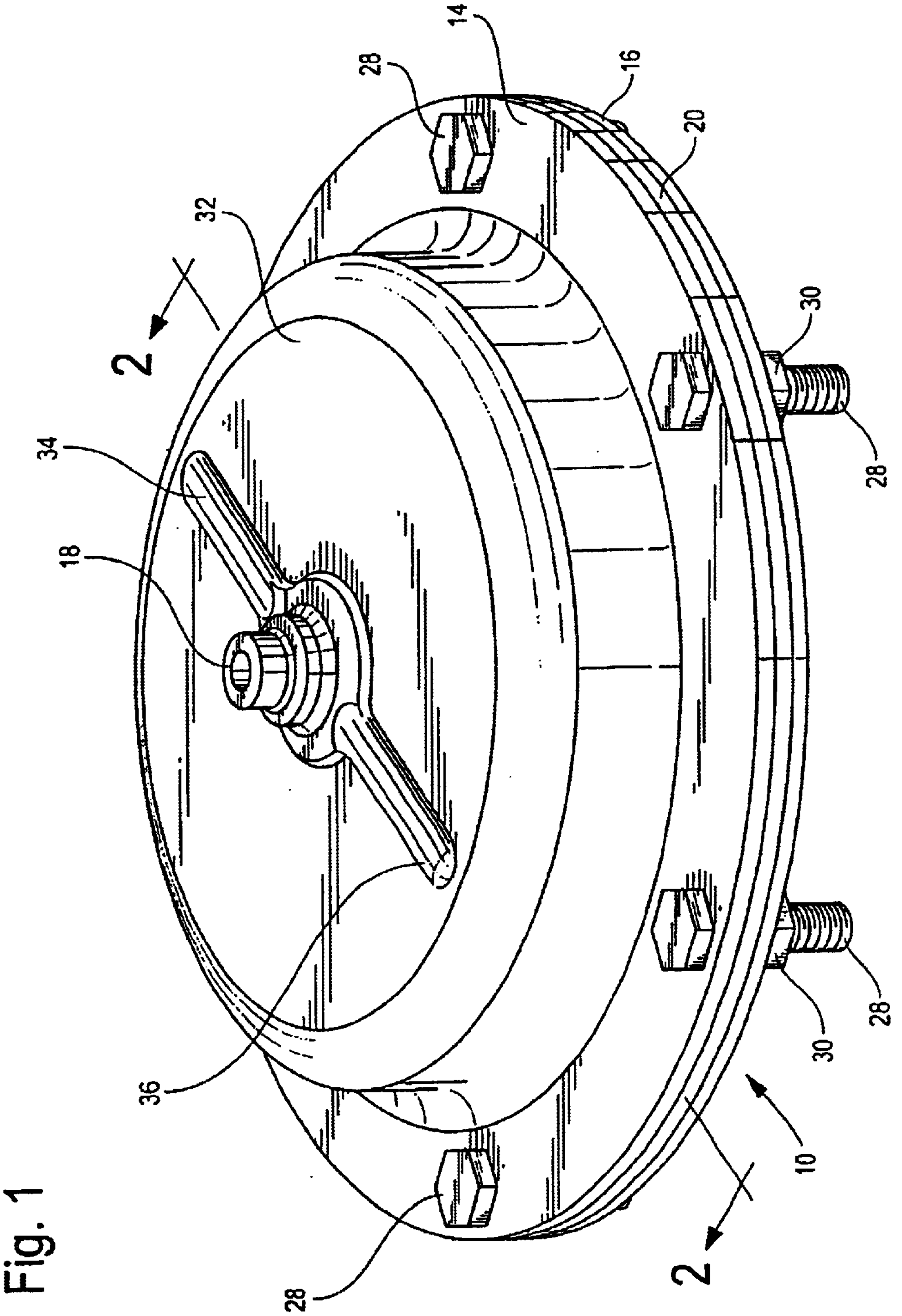
FIG. 1 is a perspective view of a control valve pressure actuator.
Figure 2:
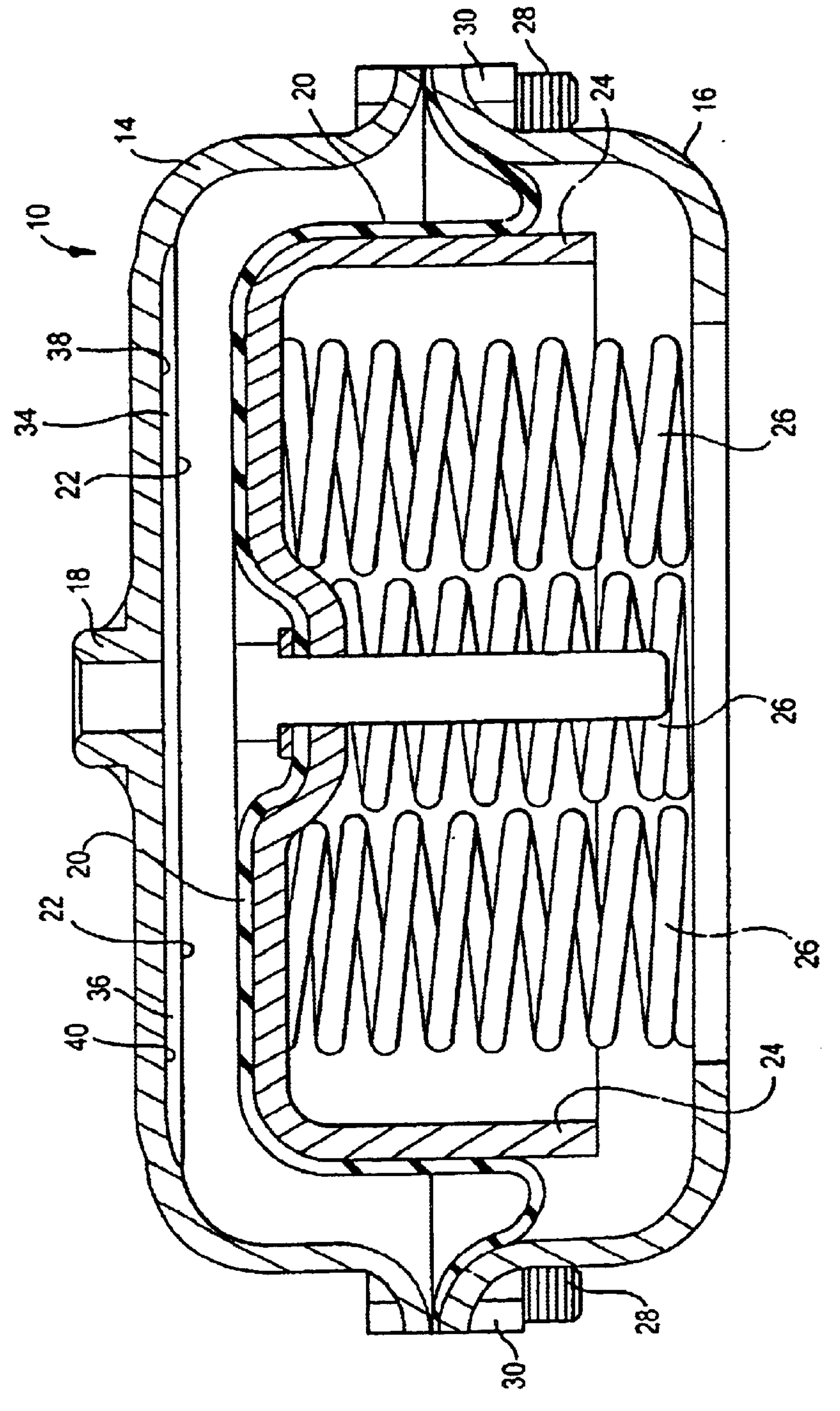
FIG. 2 is a cross-sectional view taken along lines 2—2 of FIG. 1.

Referring to FIGS. 1 and 2, a control valve pressure actuator 10 is shown having an upper diaphragm casing 14 and a lower diaphragm casing 16. A vent or air port 18 is provided in the upper diaphragm casing 14, preferably at the center thereof, to facilitate application of pressure tubing (not shown). The control valve pressure actuator 10 is of the pressure-to-close type, meaning that a diaphragm 20 within the upper diaphragm casing 14 fails in an open position, adjacent the inside surface 22 of the upper diaphragm casing 14, when there is an absence of air pressure.

The diaphragm 20 is mounted on a diaphragm plate 24. The diaphragm plate 24 is mounted on one or more springs 26, which serve to bias the diaphragm 20 toward the open position. A plurality of bolts 28 and nuts 30 are employed at periodic positions about the upper diaphragm casing 14 and lower diaphragm casing 16, with the diaphragm 20 secured therebetween.

A top surface 32 of the upper diaphragm casing 14 is seen in FIG. 1 to include two raised projections thereon, which are preferably directed radially outwardly from the center of the upper diaphragm casing 14. Directly under these raised projections are channels 34, 36, which define air passages within the upper diaphragm casing 14. These air passage channels 34, 36 are preferably stamped into the upper diaphragm casing 14, and provide a region above the diaphragm 20 that allows for the circulation of air above the diaphragm 20 even when the diaphragm 20 is in its fully open position adjacent the inner surface 22 of the upper diaphragm casing 14. Alternatively, the air passage channels 34, 36 may be cast into the upper diaphragm casing 14. The upper diaphragm casing 14 is stamped, or alternately, cast, using a mold having a ridge on a top surface thereof for each air passage channel 34, 36 to be imparted to the upper diaphragm casing 14. The air passage channels 34, 36 each has an uppermost inner surface 38, 40, which is higher than the inner surface 22 of the upper diaphragm casing 14.

The air passage channels 34, 36 preferably communicate with the air port 18. The air passage channels 34, 36 also advantageously enhance the stiffness of the upper diaphragm casing 14, enabling the control valve pressure actuator 10 to operate at even higher pressures than diaphragm casings lacking such air passage channels.

It is recognized that the number and orientation of air passage channels 34, 36 may be varied as desired by the manufacturer. For example, turning to FIG. 3, a control valve pressure actuator 50 is shown having an upper diaphragm casing 54. Projecting radially outwardly from an air port 56, which is preferably provided at the center of the upper diaphragm casing 54, are four air passage channels 58, 60, 62, 64. The four air passage channels 58, 60, 62, 64 are like the air passage channels 34, 36 described in the previous embodiment, in that they each have an uppermost inner surface (not shown) which is higher than the inner surface (also not shown) of the upper diaphragm casing 54. The air passage channels 58, 60, 62, 64 allow the circulation of air above the diaphragm 68 (the outer edge of which is shown sandwiched between the upper diaphragm casing 54 and a lower diaphragm casing 70), even when the diaphragm 68 is in its fully open position, adjacent an inside surface of the top of the upper diaphragm casing 54. This circulation of air above the diaphragm 68 prevents the diaphragm 68 from sealing against the inside surface of the upper diaphragm casing 54 when the diaphragm is in the fully open position, and also enhances the stiffness of the upper diaphragm casing 54, enabling the control valve pressure actuator 50 to operate at higher pressures than comparable pressure actuators lacking such air passage channels.

Figure 3:
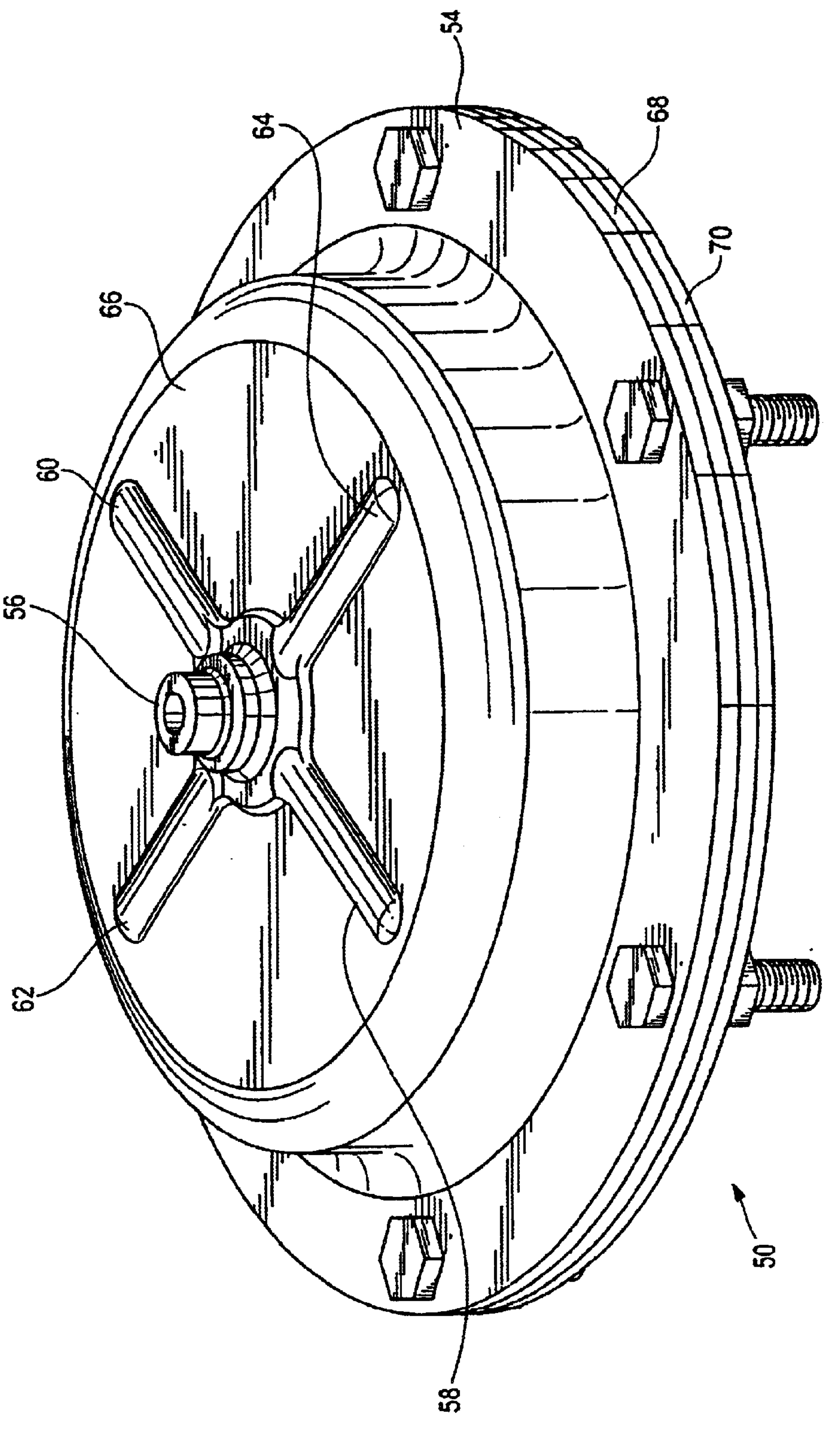
FIG. 3 is a perspective view of an alternate embodiment of a control valve pressure actuator.

While the first embodiment of the upper diaphragm casing 14 shown in FIGS. 1 and 2 has two air passage channels 34, 36, and the second embodiment of the upper diaphragm casing 54 shown in FIG. 3 has four air passage channels 58, 60, 62, 64, there could be yet additional air passage channels provided in the upper diaphragm casing. Preferably, the number of air passage channels is in a range from one to six, but the number is only limited by the ability to stamp or cast the air passage channels. Because there is limited space on the upper surfaces 32, 66 of the upper diaphragm casings 14, 54, and it is important for the manufacturer to be able to place markings on the upper surfaces 32, 66, such as model number, control valve specifications, ratings, manufacturing date, and the like, larger control valve pressure actuators may accommodate yet additional air passage channels in the upper diaphragm casing while still providing sufficient area on the upper surface to display any necessary and/or desired markings. For example, an upper diaphragm casing may be provided with six radially extending air passage channels, arranged in an asterisk ("*") pattern about the centrally located air port.

As a further alternate, it is recognized that air passage channels may be provided by forming ridges on the diaphragm plate, instead of or in addition to (so long as not aligned with) the air passage channels provided in the upper diaphragm casing. In such an embodiment, the topography of the diaphragm plate, due to the ridges thereon, results in an uneven surface on which the diaphragm sits. Air passage channels are thereby formed between the top of the diaphragm and the inside surface of the top of the upper diaphragm casing, resulting in an increased area available beneath the top of the upper diaphragm casing for pressurization of the diaphragm, in a manner similar to the air passage channels located in the upper diaphragm casing, as described in the previous embodiments.

While certain preferred embodiments have been described, it is recognized that variations may be made thereto that are still within the scope of the appended claims.

We claim:

1. An improved control valve pressure actuator having an upper diaphragm casing having an air port therein, a lower diaphragm casing, a diaphragm positioned between the upper and lower diaphragm casings, the diaphragm being mounted on a diaphragm plate and biased toward a fully open position adjacent an inside surface at a top end of the upper diaphragm casing by one or more springs wherein the air port defines an effective area of the diaphragm such that an air pressure transmitted through the air port creates a operating force across the effective area to oppose a force generated by the springs during operation of the control valve pressure actuator, the improvement comprising:

one or more air passage channels within the upper diaphragm casing wherein the air passage channels substantially increase the effective area of the diaphragm thereby generating an additional operating force upon the diaphragm when the diaphragm is motivated from the fully open position.

2. The improved control valve pressure actuator of claim 1, wherein the improvement further comprises the one or more air passage channels projecting radially outwardly from the air port.

3. The improved control valve pressure actuator of claim 1, wherein the improvement further comprises the number of one or more air passage channels being in a range from 1 to 6.

4. The improved control valve pressure actuator of claim 1, wherein the improvement further comprises each of the one or more air passage channels projecting upwardly from a generally flat surface at the top of the upper diaphragm casing.

5. A method for preventing a diaphragm of a pressure-to-close control valve pressure actuator from sealing in an open position, comprising:

(a) forming a mold for an upper diaphragm casing having one or more ridges on a top surface thereof;

(b) using the formed mold to stamp or cast an upper diaphragm casing for a control valve pressure actuator, whereby the one or more ridges correspondingly impart one or more air passage channels within the upper diaphragm casing; and (c) assembling a control valve pressure actuator using the stamped upper diaphragm casing, such that the air passage channels are oriented above a diaphragm positioned between the upper diaphragm casing and a lower diaphragm casing to facilitate circulation of air above the diaphragm when the diaphragm is initially motivated from a fully open position adjacent an inside surface at a top end of the upper diaphragm casing.

6. The method of claim 5, wherein in forming the mold, the one or more ridges project radially outwardly from a center of the top surface thereof.

7. The method of claim 5, wherein in forming the mold, the mold is provided with a number of ridges in a range from 1 to 6.

8. An upper diaphragm casing for a control valve pressure actuator, comprising:

(a) a lower portion adapted to be secured to a diaphragm and a lower diaphragm casing; and (b) an upper portion having a generally flat surface thereon, the upper portion including one or more projections corresponding to one or more air passage channels provided in an inside of the upper portion, the one or more air passage channels facilitating circulation of air between the upper portion of the diaphragm casing and the diaphragm when the diaphragm is substantially adjacent to an inside surface of the upper portion of the upper diaphragm casing.

9. The upper diaphragm casing of claim 8 further including air port provided in the upper surface, the air port being in communication with each of the one or more air passage channels.

10. The upper diaphragm casing of claim 9, wherein each of the one or more air passage channels project radially outwardly from a center of the upper portion of the upper diaphragm casing.

11. The upper diaphragm casing of claim 9, wherein the air port is centrally disposed in the upper portion of the upper diaphragm casing, and each of the one or more air passage channels project radially outwardly from the air port.

12. The upper diaphragm casing of claim 8, wherein the number of the one or more air passages is in a range from 1 to 6.

* * * * *

UNITED STATES PATENT AND TRADEMARK OFFICE

CERTIFICATE OF CORRECTION

PATENT NO. : 6,827,001 B2
DATED : December 7, 2004
INVENTOR(S) : Chad Engle et al.

It is certified that error appears in the above-identified patent and that said Letters Patent is hereby corrected as shown below:

<u>Column 4,</u>
Line 21, please delete "a operating force" and insert -- an operating force --.

Signed and Sealed this

Twenty-ninth Day of March, 2005

JON W. DUDAS
*Director of the United States Patent and Trademark Office*